US011121533B2

(12) United States Patent
Baldwin

(10) Patent No.: US 11,121,533 B2
(45) Date of Patent: Sep. 14, 2021

(54) ELECTRICAL BOX WITH REVERSIBLE COVER AND LATCH

(71) Applicant: Reliance Controls Corporation, Racine, WI (US)

(72) Inventor: Jeffrey P. Baldwin, Phoenix, AZ (US)

(73) Assignee: Reliance Controls Corporation, Racine, WI (US)

( * ) Notice: Subject to any disclaimer, the term of this patent is extended or adjusted under 35 U.S.C. 154(b) by 111 days.

(21) Appl. No.: 16/554,891

(22) Filed: Aug. 29, 2019

(65) Prior Publication Data

US 2020/0083688 A1 Mar. 12, 2020

Related U.S. Application Data

(60) Provisional application No. 62/729,216, filed on Sep. 10, 2018.

(51) Int. Cl.
*H02G 3/08* (2006.01)
*H02G 3/14* (2006.01)
*G04B 37/04* (2006.01)

(52) U.S. Cl.
CPC .............. *H02G 3/14* (2013.01); *G04B 37/04* (2013.01); *H02G 3/081* (2013.01)

(58) Field of Classification Search
CPC  H02G 3/08; H02G 3/081; H02G 3/14; H02G 3/088; G04B 37/04; H01H 9/02; H01H 9/04; H01H 9/042; H01H 43/022
USPC ...... 174/50, 53, 57, 58, 66, 67; 220/3.2–3.9, 220/4.02, 241, 242
See application file for complete search history.

(56) References Cited

U.S. PATENT DOCUMENTS

| 932,601 | A | 8/1909 | Corbett |
| 2,688,366 | A | 9/1954 | Morrison |
| 2,898,993 | A | 8/1959 | Huff |
| 3,033,950 | A | 5/1962 | Flegel |
| 3,432,611 | A | 3/1969 | Gaines |
| 3,555,214 | A | 1/1971 | Lee et al. |
| 3,716,815 | A | 2/1973 | Riches |
| 3,925,629 | A | 12/1975 | Albinger, Jr. |
| 4,297,546 | A | 10/1981 | Koch |
| 4,311,886 | A | 1/1982 | Rulseh |
| 4,381,063 | A | 4/1983 | Leong |
| 4,766,331 | A | 8/1988 | Flegel et al. |
| 4,810,397 | A | 3/1989 | Shotey |
| 4,822,964 | A | 4/1989 | Koch |
| 4,853,558 | A | 8/1989 | Skarivoda |
| 5,245,507 | A | 9/1993 | Ericksen |
| 5,266,841 | A | 11/1993 | Flegel |

(Continued)

*Primary Examiner* — Angel R Estrada
(74) *Attorney, Agent, or Firm* — Boyle Fredrickson, S.C.

(57) ABSTRACT

An enclosure, such as an electrical enclosure, includes a base having a series of walls that define an interior, and a cover. The base and cover include a hinge arrangement that enables the cover to be secured to the base for movement between a closed position and an open position. The hinge arrangement enables the cover to be hinged to either a first wall of the base or an opposite, second wall of the base. A latch member is configured to be selectively engaged with either the first wall of the base or the second wall of the base, and is engaged with the second wall of the base when the cover is hinged to the first wall of the base and is engaged with the first wall of the base when the cover is hinged to the second wall of the base.

18 Claims, 18 Drawing Sheets

(56) References Cited

U.S. PATENT DOCUMENTS

| | | |
|---|---|---|
| 5,329,082 A | 7/1994 | Saarem |
| 5,747,760 A | 5/1998 | Skarivoda |
| 5,763,831 A | 6/1998 | Shotey et al. |
| D408,303 S | 4/1999 | Janda et al. |
| D409,505 S | 5/1999 | Janda et al. |
| 5,944,209 A | 8/1999 | Daoud |
| 6,007,353 A | 12/1999 | Webster |
| D430,497 S | 9/2000 | Michaels |
| 6,133,531 A | 10/2000 | Hayduke et al. |
| 6,476,321 B1 | 11/2002 | Shotey et al. |
| 6,636,458 B1 | 10/2003 | Uptegraph |
| 6,700,063 B2 | 3/2004 | Shotey et al. |
| 6,723,922 B1 | 4/2004 | Shotey et al. |
| 6,806,426 B1 | 10/2004 | Gretz |
| D500,453 S | 1/2005 | Cullen et al. |
| 6,894,223 B1 | 5/2005 | Shotey et al. |
| 6,921,861 B1 | 7/2005 | Gretz |
| 6,979,777 B2 | 12/2005 | Marcou et al. |
| 7,071,415 B1 | 7/2006 | Shotey et al. |
| 7,396,996 B1 | 7/2008 | Shotey et al. |
| 7,396,997 B2 | 7/2008 | Dinh |
| 7,462,777 B2 | 12/2008 | Dinh |
| 7,554,037 B1 | 6/2009 | Shotey et al. |
| 7,598,452 B1 * | 10/2009 | Shotey ............... H01R 13/5213 174/66 |
| 7,619,162 B2 | 11/2009 | Dinh et al. |
| 7,763,799 B2 | 7/2010 | Johnson |
| 8,110,743 B2 | 2/2012 | Drane |
| 8,153,895 B2 | 4/2012 | Drane |
| 8,415,573 B2 | 4/2013 | Lipp et al. |
| 8,899,432 B2 | 12/2014 | Jolly |
| 9,450,390 B1 | 9/2016 | Flegel |
| 9,658,603 B2 | 5/2017 | Baldwin et al. |
| 10,340,676 B2 * | 7/2019 | Wijaya ..................... H02G 3/14 |
| 2007/0290584 A1 | 12/2007 | Dinh et al. |
| 2009/0211779 A1 | 8/2009 | Drane |
| 2010/0181091 A1 | 7/2010 | Drane |

* cited by examiner

ELECTRICAL BOX WITH REVERSIBLE COVER AND LATCH

CROSS-REFERENCE TO RELATED APPLICATION

This application claims the benefit of U.S. provisional patent application Ser. No. 62/729,216 filed Sep. 10, 2018, the entire disclosure of which is hereby incorporated by reference.

BACKGROUND AND SUMMARY

This disclosure relates to an enclosure of the type having a base defining an interior, and a cover that is movable between an open position to allow access to the interior of the base and a closed position to prevent such access. Representatively, an enclosure of this type may be employed to house a mechanism or device, such as a timer mechanism, although the enclosure may be employed for virtually any use or application as desired.

An enclosure of the type generally described typically includes a hinge arrangement, which is separate from the cover and the base, and with which the cover and base are interconnected so as to movably secure the cover to the base for movement between the open and closed positions. In one form, one side of the base is specifically designed to mount the hinge mechanism and the other side of the base typically has a latch for selectively maintaining the cover in the closed position. In another form, the base and the hinge mechanism are designed such that the hinge mechanism can be mounted to either wall of the base, to provide either a right-hand swing or a left-hand swing of the cover between the open and closed positions. Designs such as this provide efficiencies in manufacture since dedicated components are not required for both left-hand swing and right-hand swing configurations. However, such designs include numerous components that typically require the use of fasteners to secure the hinge mechanism to the cover and to the base.

It is an object of the present invention to provide a simplified version of an enclosure in which the hinge mechanism is eliminated, and the cover can be hinged directly to the base in either a left-hand swing or a right-hand swing configuration.

In accordance with one aspect of the invention, an enclosure, such as but not limited to an electrical enclosure, includes a base having a series of walls that cooperate to define an interior, and a cover. The base and cover include a hinge arrangement that enables the cover to be secured to the base for movement between a closed position in which access to the interior of the base is prevented and an open position that allows access to the interior of the base. The hinge arrangement enables the cover to be hinged to either a first wall of the base or an opposite, second wall of the base. A latch member is configured to be selectively engaged with either the first wall of the base or the second wall of the base, and is engaged with the second wall of the base when the cover is hinged to the first wall of the base and is engaged with the first wall of the base when the cover is hinged to the second wall of the base.

The hinge arrangement may be in the form of a first set of slots on the first wall of the base and a second set of slots on the second wall of the base, in combination with a set of tabs on the cover. The tabs are engageable with the first set of slots to hinge the cover to the first wall of the base and are engageable with the second set of slots to hinge the cover to the second wall the base. Representatively, each tab has a T-shaped configuration and is positioned within one of the slots such that a stem of the tab is positioned within the slot and an ear of the tab is engaged with the cover adjacent the slot so as to prevent removal of the tab from the slot.

The latch member may include a retainer tab and an engagement tab, and the first wall of the base may include a first retainer opening and a first engagement slot spaced therefrom, and the second wall of the base may include a second retainer opening and a second engagement slot spaced therefrom. The retainer tab of the latch member is received within the first retainer opening and the engagement tab is movable within the first engagement slot to a first engaged position to secure the retainer member.

The first latch member openings may be centered on a height of the first wall and the second latch member openings may be centered on a height of the second wall, and the first set of slots on the first wall of the base are offset from a center of the height of the first wall and the second set of slots on the second wall of the base are offset from a center of the height of the second wall.

In accordance with another aspect, the invention contemplates a base having a series of walls that cooperate to define an interior, and a cover, with the base and cover including a hinge arrangement that enables the cover to be secured to the base for movement between a closed position in which access to the interior of the base is prevented and an open position that allows access to the interior of the base. The hinge arrangement enables the cover to be hinged to either a first wall of the base or an opposite, second wall of the base.

In accordance with another aspect, the invention contemplates a method of assembling an enclosure, comprising the acts of providing a base defining an interior and first and second spaced apart walls, wherein the first wall includes a series of first cover engagement openings and a first latch engagement structure, and wherein the second wall includes a series of second cover engagement openings and a second latch engagement structure; providing a cover having a series of spaced apart hinge tabs; and providing a latch. The method further includes hingedly securing the cover to either the first wall by engaging the hinge tabs of the cover with the first cover engagement openings or to the second wall by engaging the hinge tabs of the cover with the second cover engagement openings; and securing the latch to the second wall when the cover is hingedly secured to the first wall by engaging the latch with the second latch engagement structure, or securing the latch to the first wall when the cover is hingedly secured to the second wall by engaging the latch with the first latch engagement structure.

Other aspects, features and advantages of the invention will become apparent to those skilled in the art from the following detailed description and accompanying drawings. It should be understood, however, that the detailed description and specific examples, while indicating certain embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements can be several views, and in which.

Figure 1:
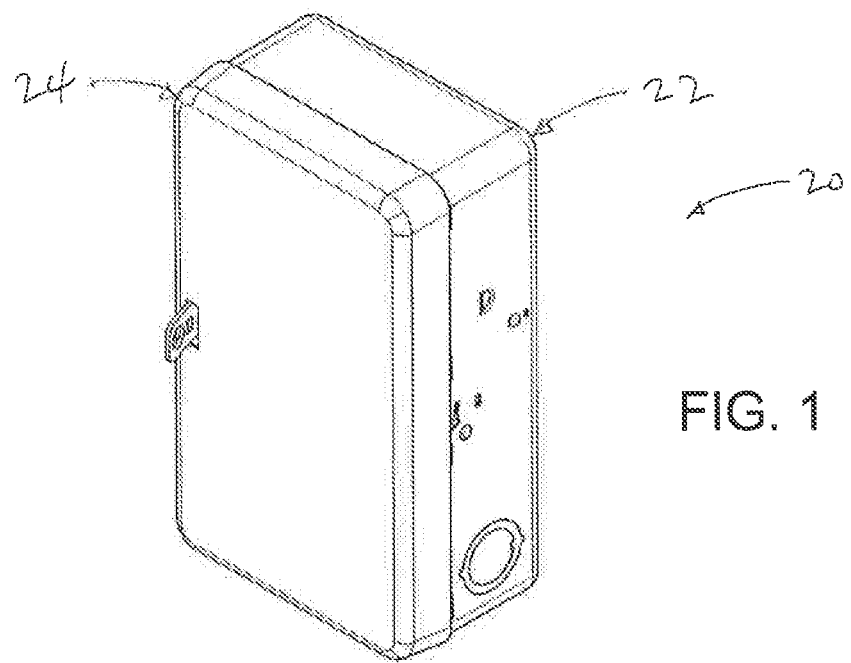
FIG. 1 is a right side isometric view of an electrical box with a reversible latch and cover in accordance with an embodiment of the present invention, showing the cover in a closed position.

In describing the embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected," "attached," or terms similar thereto are often used. They are not limited to direct connection or attachment, but include connection or attachment to other elements where such connection or attachment is recognized as being equivalent by those skilled in the art.

DETAILED DESCRIPTION

The various features and advantageous details of the subject matter disclosed herein are explained more fully with reference to the non-limiting embodiments described in detail in the following description.

Figure 2:
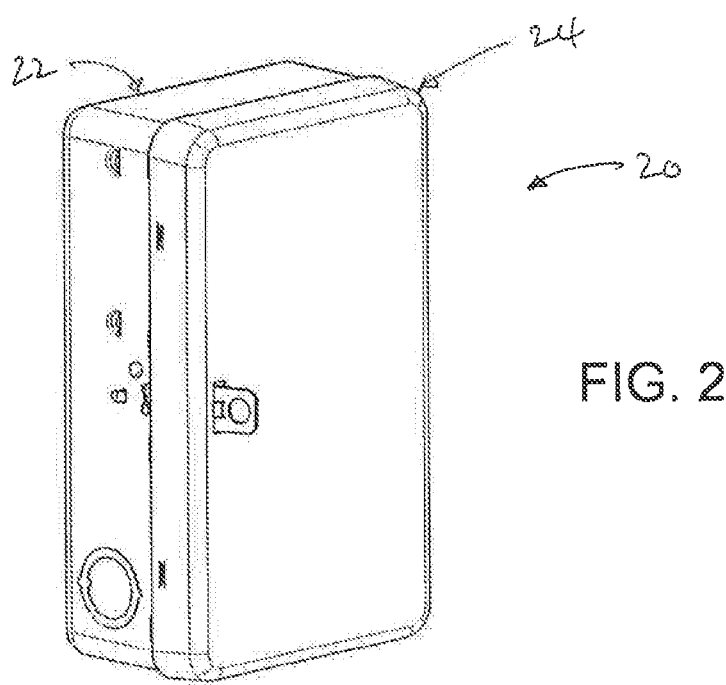
FIG. 2 is a left side isometric view of the electrical box of FIG. 1.
Figure 3:
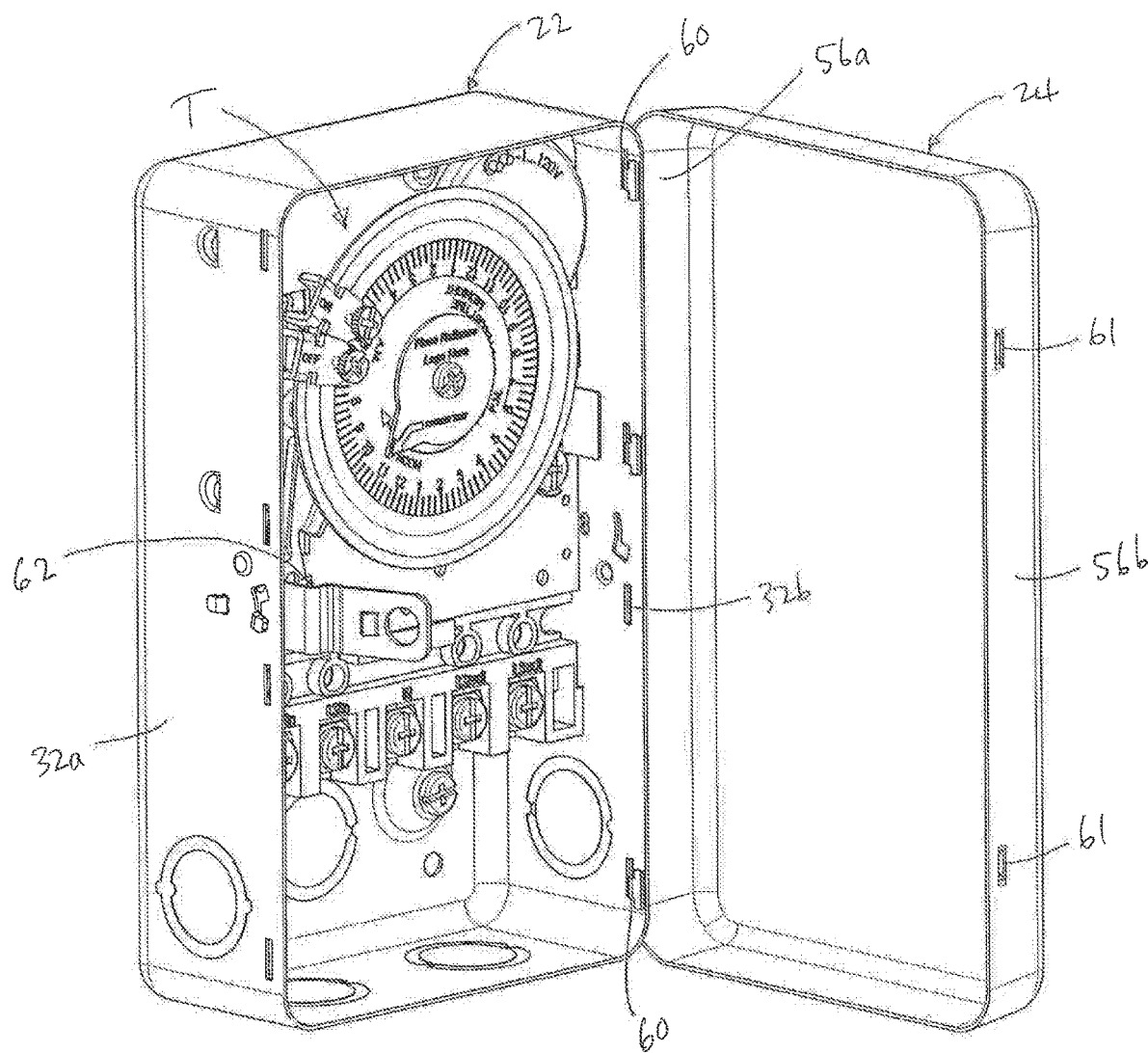
FIG. 3 is an isometric view of the electrical of FIGS. 1 and 2, showing the cover in an open position, and in which the cover is hinged to a left side wall of a base of the electrical box and the latch is secured to the right side wall.

Referring to the following description in which like reference numerals represent like parts throughout the disclosure, an electrical box in accordance with the present invention is shown generally at 20 in FIGS. 1-3. The electrical box 20 includes a base 22 and a lid or cover 24. While the box 20 is generally of the type that is employed to house electrical components such as a timer mechanism T, it is understood that the box 20 may be used for any other satisfactory purpose and to contain other equipment or components, as desired.

Figure 4:
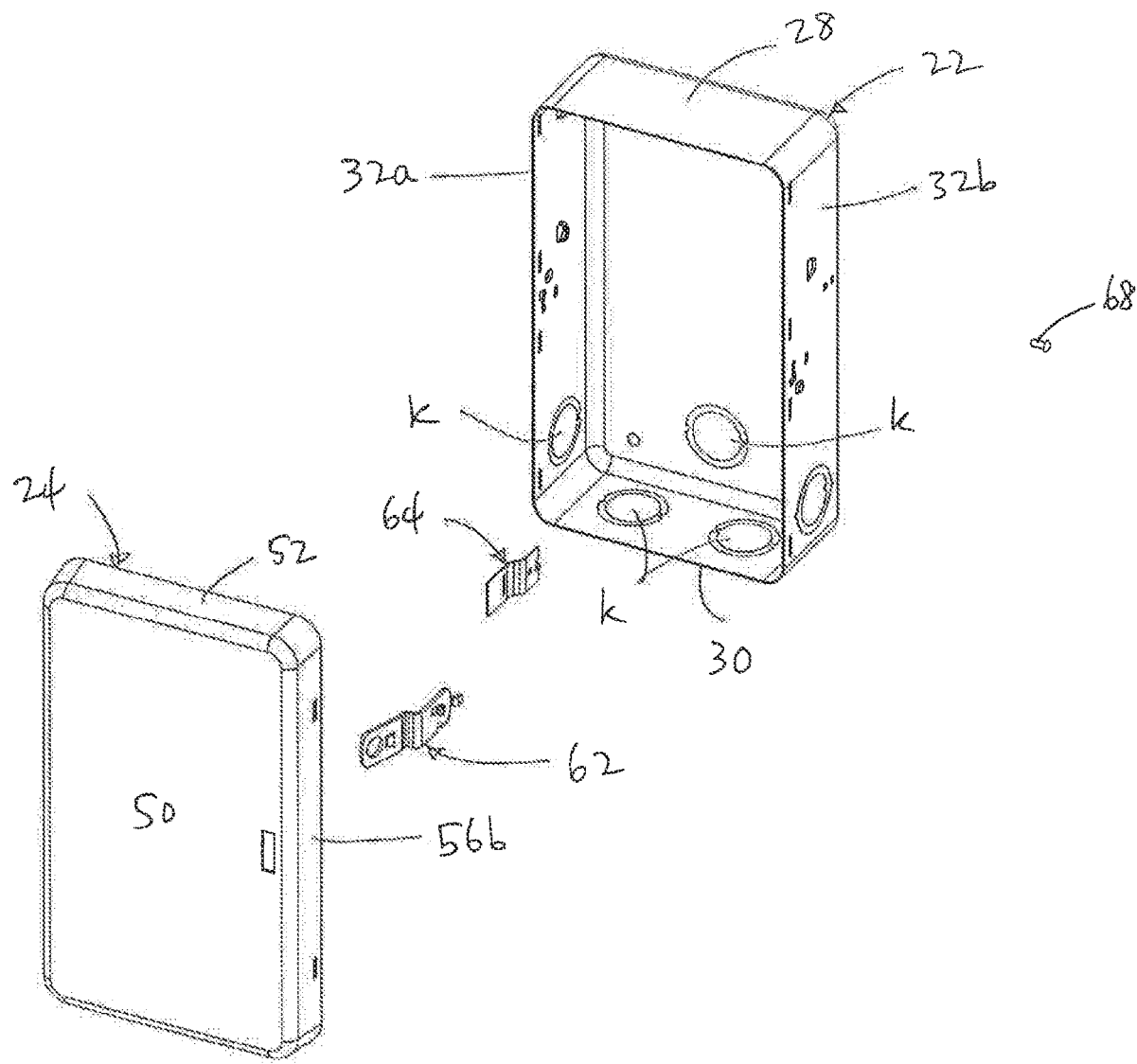
FIG. 4 is an exploded isometric view of the components incorporated in the electrical box of FIGS. 1-3.
Figure 5:
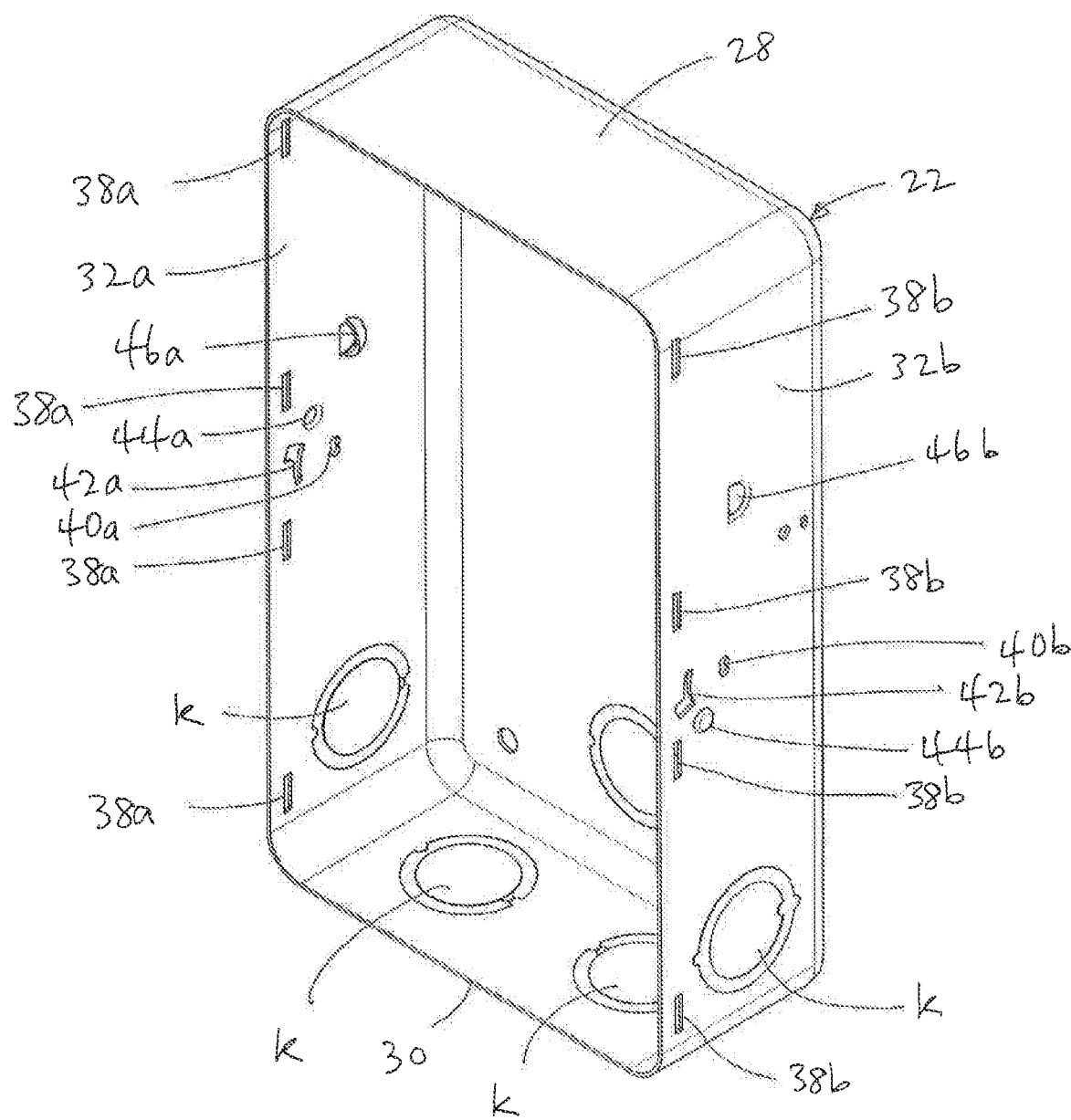
FIG. 5 is an isometric view of the base incorporated in the electrical box of FIGS. 1-4.

FIGS. 3-5 illustrate the base 22, which generally includes a back wall 26, a top wall 28, a bottom wall 30, and a pair of sidewalls 32a, 32b that extend between top wall 28 and bottom wall 30. In a manner as is known, the back wall 26, bottom wall 30 and sidewalls 32a, 32b may be provided with knockouts K for selectively creating openings in order to route cables or wires into the interior of base 22. Back wall 26 may optionally include a slot, which may be in the form of a keyhole slot, and which in combination with openings may be used to secure base 22 to a supporting surface, such as a wall or the like.

Sidewalls 32a and 32b include a number of slots, indentations, protrusions and openings for use in hingedly mounting cover 24 to base 22 in either a left-hand or a right-hand swing orientation, in a manner to be explained, and for mounting a latch that can be used to selectively secure cover 24 in a closed position when mounted to base 22 in either orientation. With reference to sidewall 32a, such structures include a series of slots 38a, one of which is located slightly below the corner defined by top wall 28 and sidewall 32a, one of which is located slightly above the corner defined by bottom wall 30 and sidewall 32a, and the remaining two of which are located one on either side of the midpoint of the height of sidewall 32a. Sidewall 32a also includes an inner latch mounting opening 40a and an outer latch mounting slot 42a, which has an open area at its upper end greater than at its lower end. Sidewall 32a also includes an outwardly extending protrusion 44a and an inwardly extending protrusion 46a. Similarly, sidewall 32b includes a series of slots 38b, one of which is located slightly below the corner defined by top wall 28 and sidewall 32b, one of which is located slightly above the corner defined by bottom wall 30 and sidewall 32b, and the remaining two of which are located one on either side of the midpoint of the height of sidewall 32b. Sidewall 32b also includes an inner latch mounting opening 40b and an outer latch mounting slot 42b, which has an open area at its lower end greater than at its upper end. Sidewall 32b also includes an outwardly extending protrusion 44b and an inwardly extending protrusion 46b.

Figure 6:
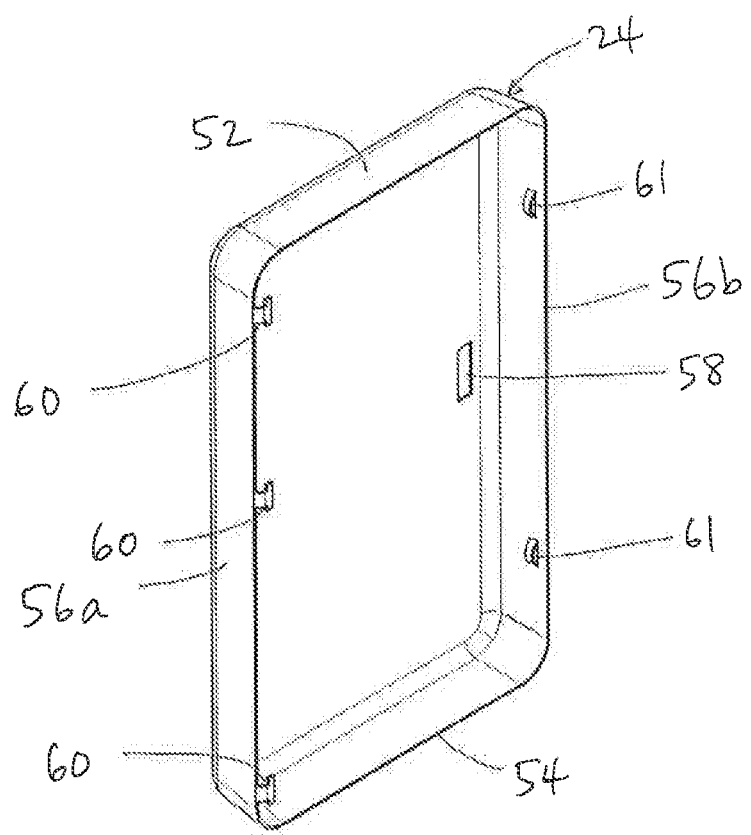
FIG. 6 is an isometric view of the cover incorporated in the electrical box of FIGS. 1-4.

Referring to FIG. 6, lid or cover 24 generally includes a front wall 50, a top wall 52, a bottom wall 54, and a pair of sidewalls 56a, 56b. A latch opening 58 is formed in front wall 50. A series of T-shaped hinge tabs 60 extend from the edge of sidewall 56a opposite front wall 50. The hinge tabs 60 extend inwardly from the sidewall 56a and may be curved adjacent their point of connection to sidewall 56a, and otherwise oriented generally perpendicularly relative to the plane of sidewall 56a. Sidewall 56b is provided with a pair of inwardly extending protrusions 61.

FIG. 4 illustrates base 22 and cover 24, as well as a lid latch 62 and a mechanism latch 64. The lid latch 62 can be secured to either sidewall 32a or 32b of base 22, in a manner to be explained. The lid latch 62 is configured for use in selectively maintaining cover 24 in a closed position and for selectively locking cover 24 in the closed position, when cover 24 is mounted to base 22 in either a right-hand swing or left-hand swing orientation. Mechanism latch 64 is employed for selectively retaining timer mechanism T, within the interior of base 22. The mechanism latch 64 may be secured to one of the base sidewalls, such as sidewall 32b, using a fastener such as a rivet 68 that extends through the base sidewall 32b and an aligned opening in mechanism latch 64, in a manner as is known. With this arrangement, mechanism latch 64 is normally in an engaged position that maintains timer mechanism 66 in position within the interior of base 22, and can be selectively moved to a release position to enable timer mechanism 66 to be withdrawn from the interior of base 22 if desired.

Figure 7:
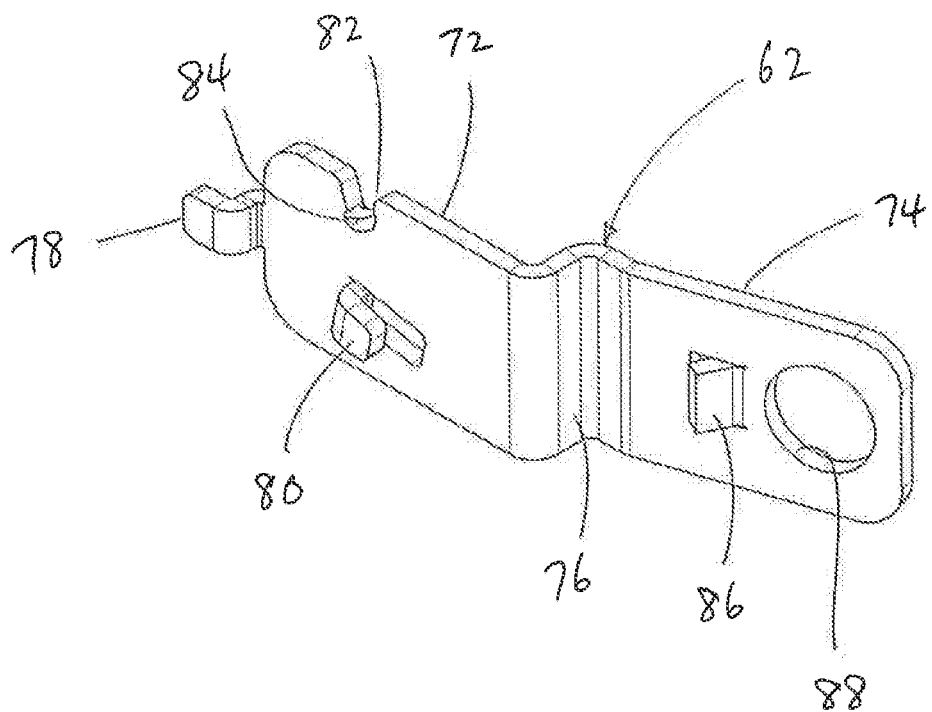
FIG. 7 is an isometric view of a reversible or repositionable latch component incorporated in the electrical box of FIGS. 1-4.
Figure 8:
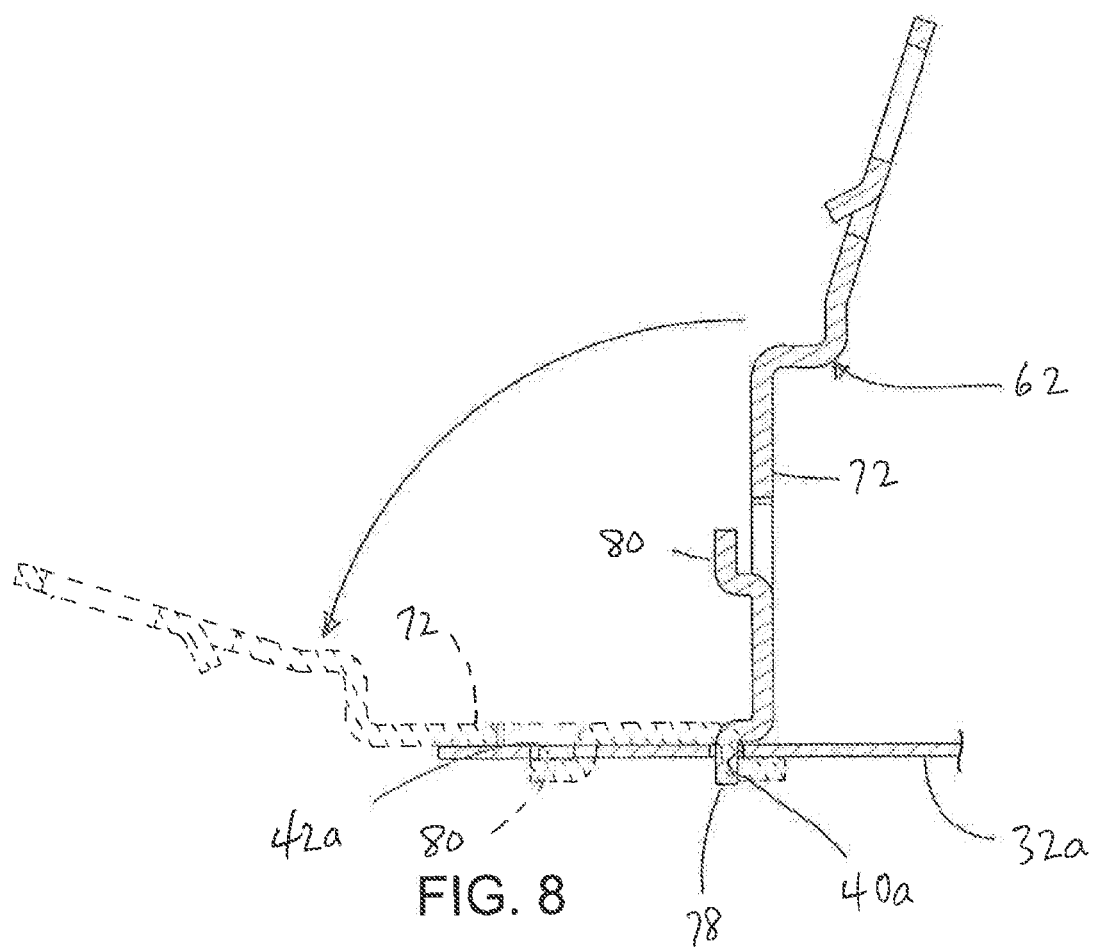
FIG. 8 is a partial section view illustrating initial engagement of the latch component of FIG. 7 with a wall of the base component of FIG. 5.
Figure 9:
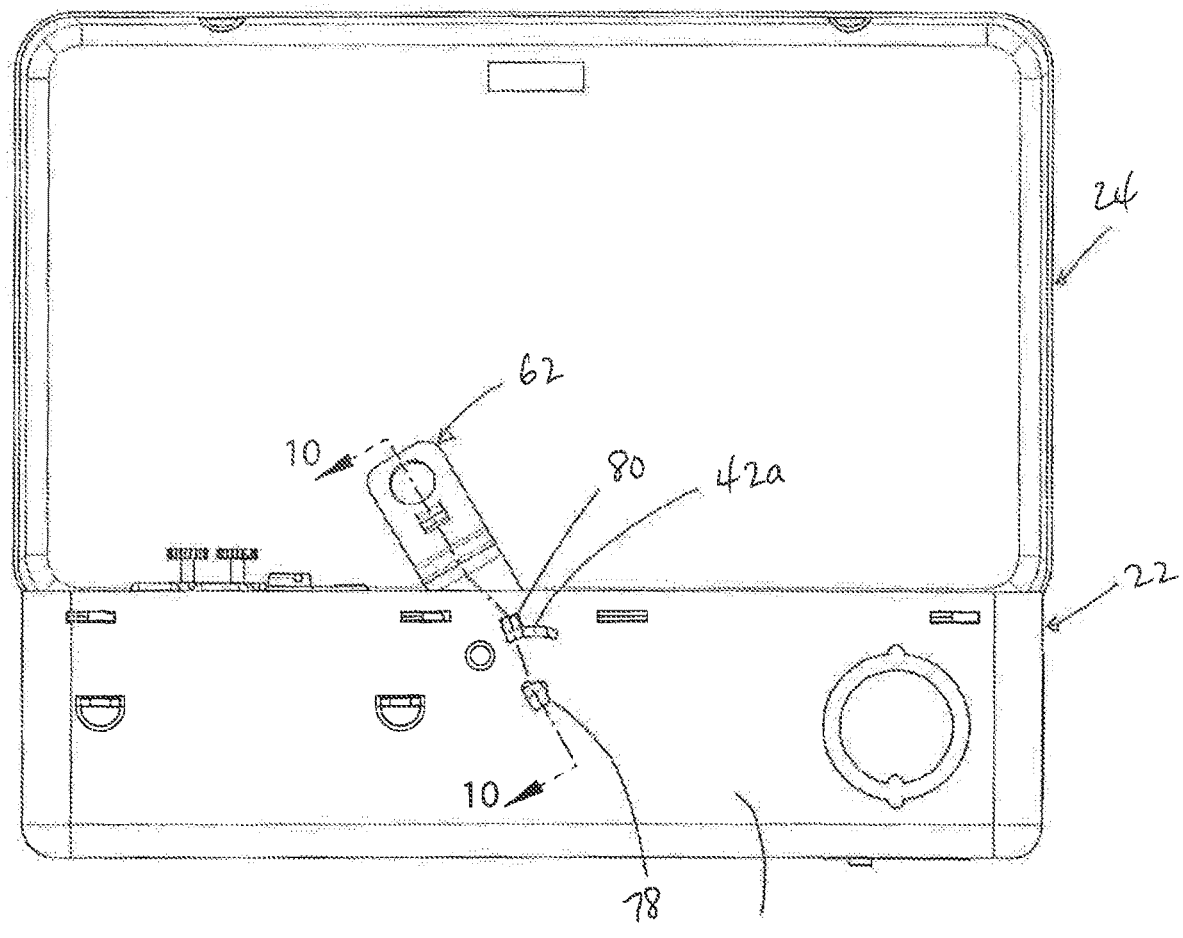
FIG. 9 is a partial elevation view illustrating the wall of the base of FIG. 5 and the latch component of FIG. 7 in an engagement step of the latch component subsequent to the initial engagement step shown in FIG. 8.
Figure 10:
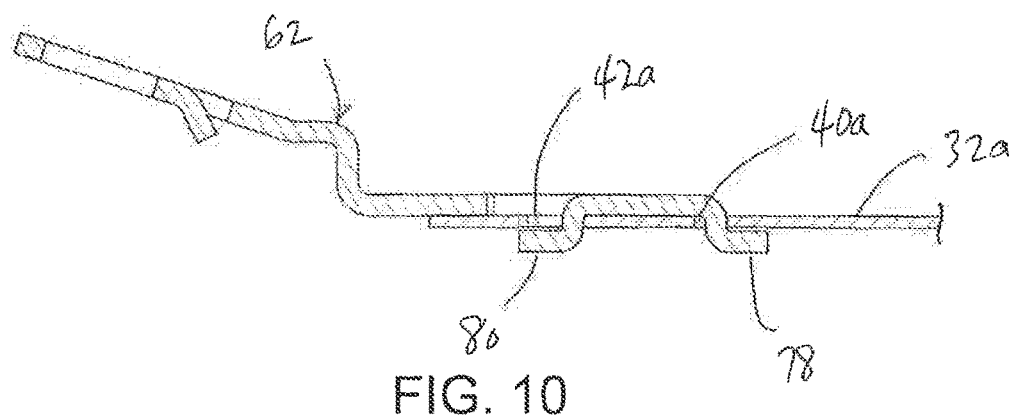
FIG. 10 is a partial section view taken along line 10-10 of FIG. 9.

As shown in FIG. 7, the lid latch 62 is configured to be engaged with the sidewall of the base 22 opposite from the sidewall with which the cover 24 is engaged. That is, when cover 24 is hingedly mounted to sidewall 32a, lid latch 62 is secured to sidewall 32b. Conversely, when cover 24 is hingedly mounted to sidewall 32b, lid latch 62 is secured to sidewall 32a.

Lid latch 62 includes a generally planar mounting portion 72 and a generally planar latch portion 74. An intermediate portion 76 is positioned between and is interconnected with mounting portion 72 and latch portion 74, and functions to angularly offset the respective portions from each other. Representatively, the lid latch 62 may be formed of a single piece of material, such as sheet metal, that is cut and formed to have a shape as illustrated. It is understood, however, that any other satisfactory material and forming method may be employed.

A retainer tab 78 extends from the end of mounting portion 72 of lid latch 62. Inwardly therefrom, an engagement tab 80 is formed by a cut and bent area of mounting portion 72. The retainer tab 78 and engagement tab 80 are offset from the plane of mounting portion 72. A notch 82 extends inwardly into mounting portion 72 from one of its edges and terminates in a guide protrusion 84.

The latch portion 74 of lid latch 62 is provided with a latch tab 86. An opening 88 is formed in latch portion 74 outwardly of latch tab 86.

Figure 11:
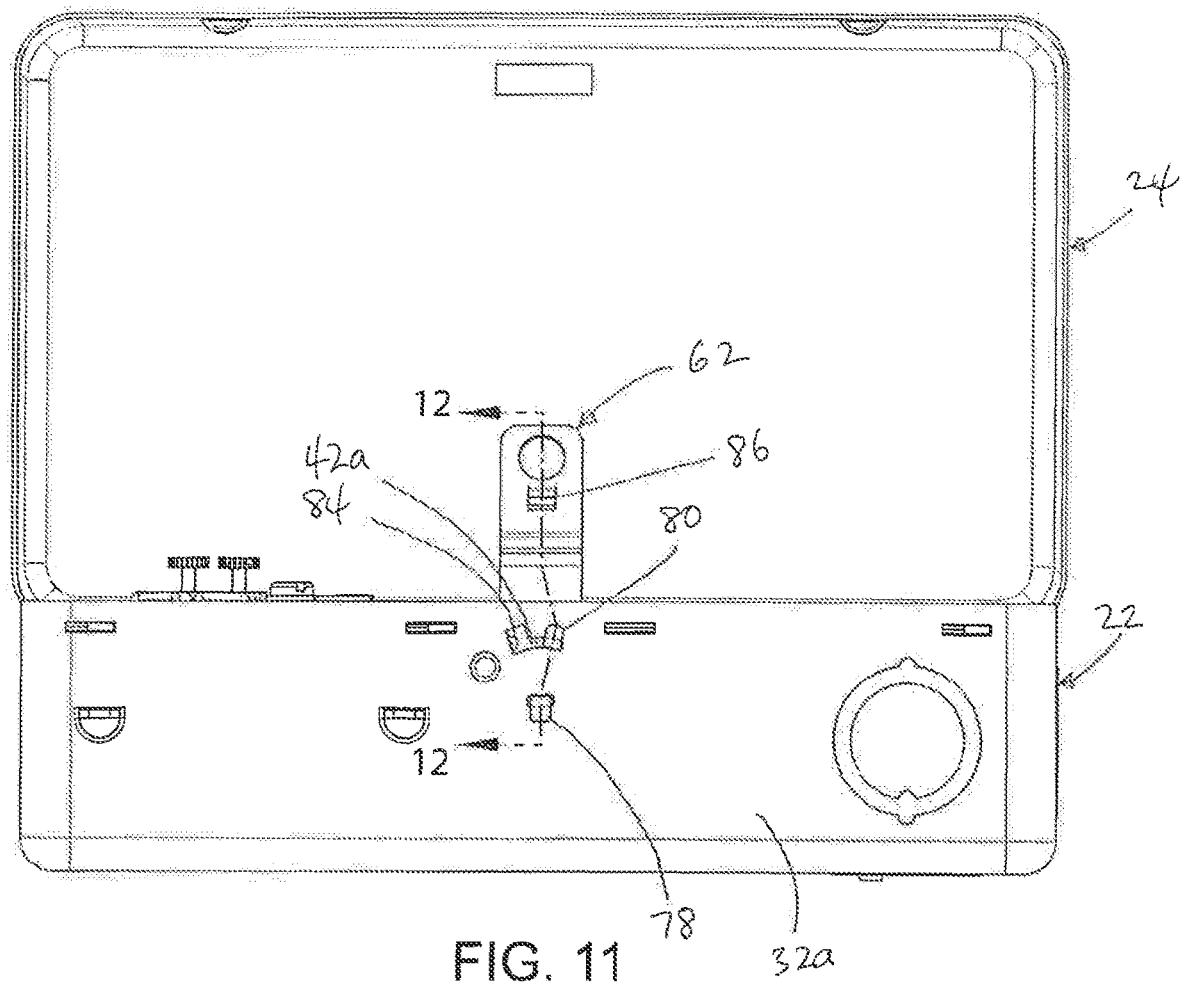
FIG. 11 is a partial elevation view similar to FIG. 9, illustrating an engagement step of the latch component subsequent to the engagement step illustrated in FIGS. 9 and 10.
Figure 12:
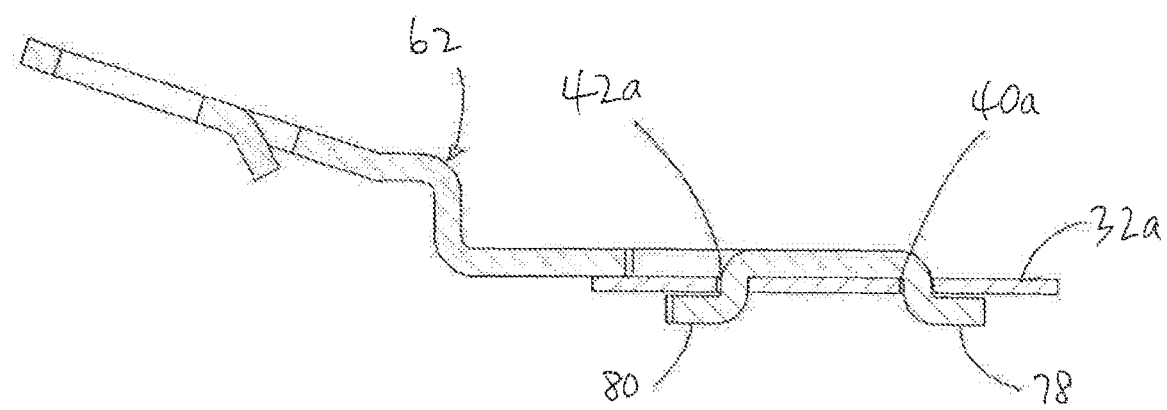
FIG. 12 is a partial section view taken along line 12-12 of FIG. 11.

FIGS. 8-12 illustrate the manner in which lid latch 62 is engaged with a side wall of base 22. As shown on in FIGS. 8-10, lid latch 62 is engaged with side wall 32a by first inserting retainer tab 78 of lid latch 62 into inner latch mounting opening 40a. Lid latch 62 is then rotated so that engagement tab 80 of lid latch 62 is aligned with the enlarged area of latch mounting slot 42a, and lid latch 62 is then pivoted laterally to simultaneously move engagement tab 80 through the enlarged upper area of latch mounting slot 42a and bring mounting portion 72 of lid latch 62 into engagement with the inside surface of side wall 32a. As shown in FIGS. 11 and 12, lid latch 62 is then rotated while retainer tab 78 is maintained within inner latch mounting opening 40a, which moves engagement tab 80 of lid latch 62 into the narrow area of slot 42a. Engagement tab 80 overlies the area of side wall 32a adjacent the narrow area of slot 42a, so that engagement tab 80 and retainer tab 78 together function to fix lid latch 62 to side wall 32a. Movement of lid latch 62 an amount sufficient to bring engagement tab 80 into contact with the inner end of the narrow area of slot 42a functions to fix the position of lid latch 62 on side wall 32a. As lid latch 62 is rotated in this manner, the guide protrusion 84 of lid latch 62 is moved into the enlarged area of slot 42a, which functions to fix the position of lid latch 62 relative to side wall 32a.

Generally the same steps as described above are carried out if it is desired to secure lid latch 62 to side wall 32b in order to provide a latch for cover 24 when cover 24 is pivotably mounted to side wall 32a in a left-hand swing orientation. In this scenario, however, pivoting movement of lid latch 62 is in an opposite, e.g. upward, direction in order to move engagement tab 80 into outer latch mounting slot 42b as opposed to downward pivoting movement of lid latch 62 during engagement of lid latch 62 with side wall 32a.

Figure 13:
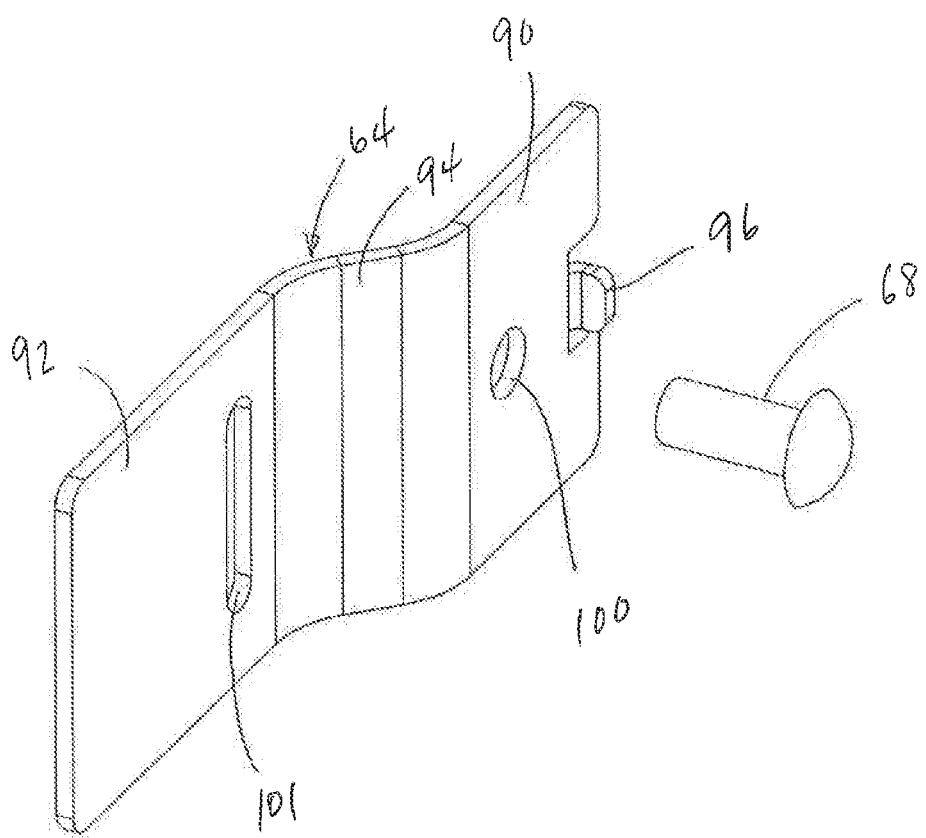
FIG. 13 is an isometric view of a timer mechanism retainer component incorporated into the electrical box of FIGS. 1-4.
Figure 14:
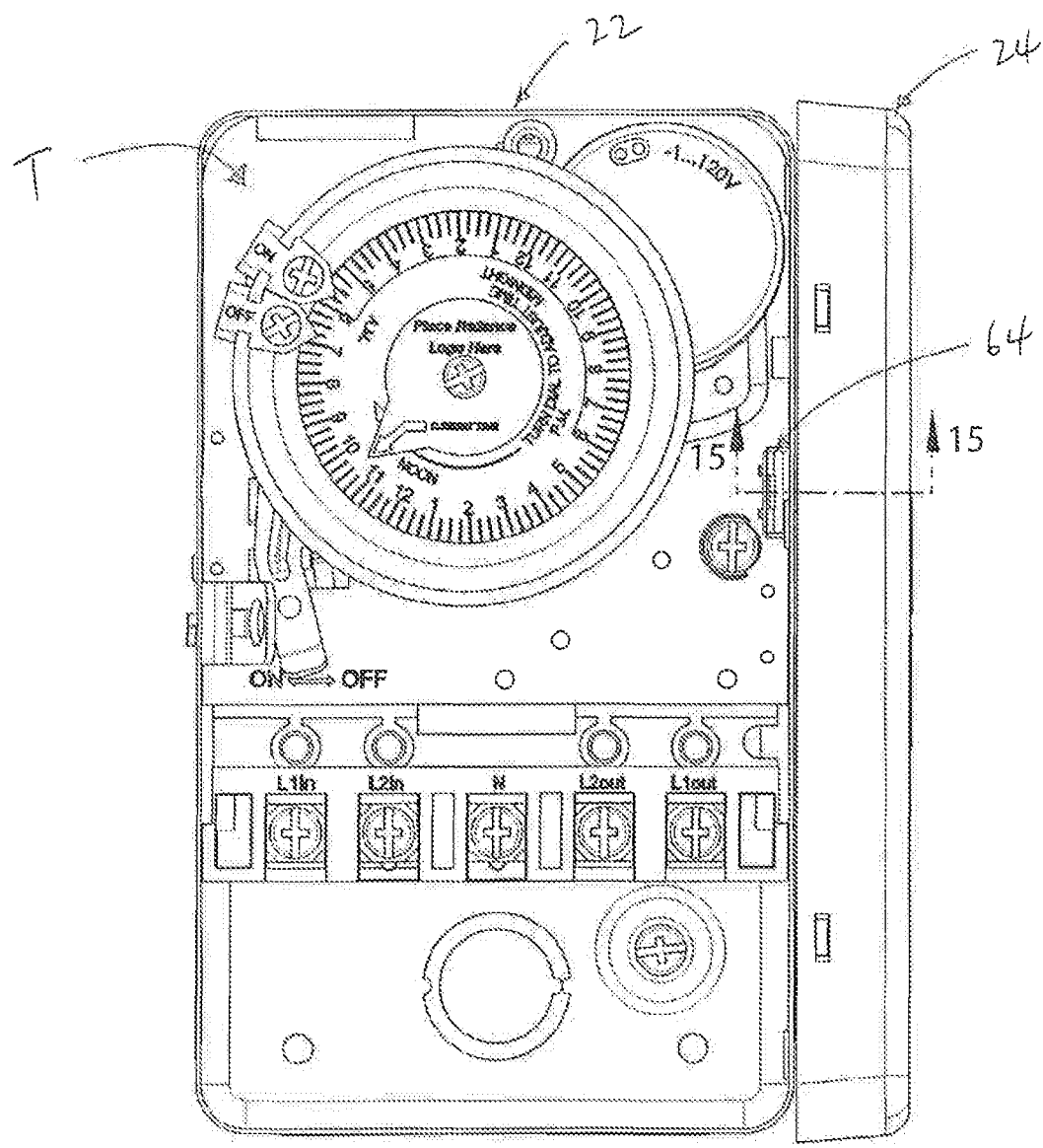
FIG. 14 is a front elevation view of the electrical box of FIGS. 1 and 3 showing the cover in the open position.
Figure 15:
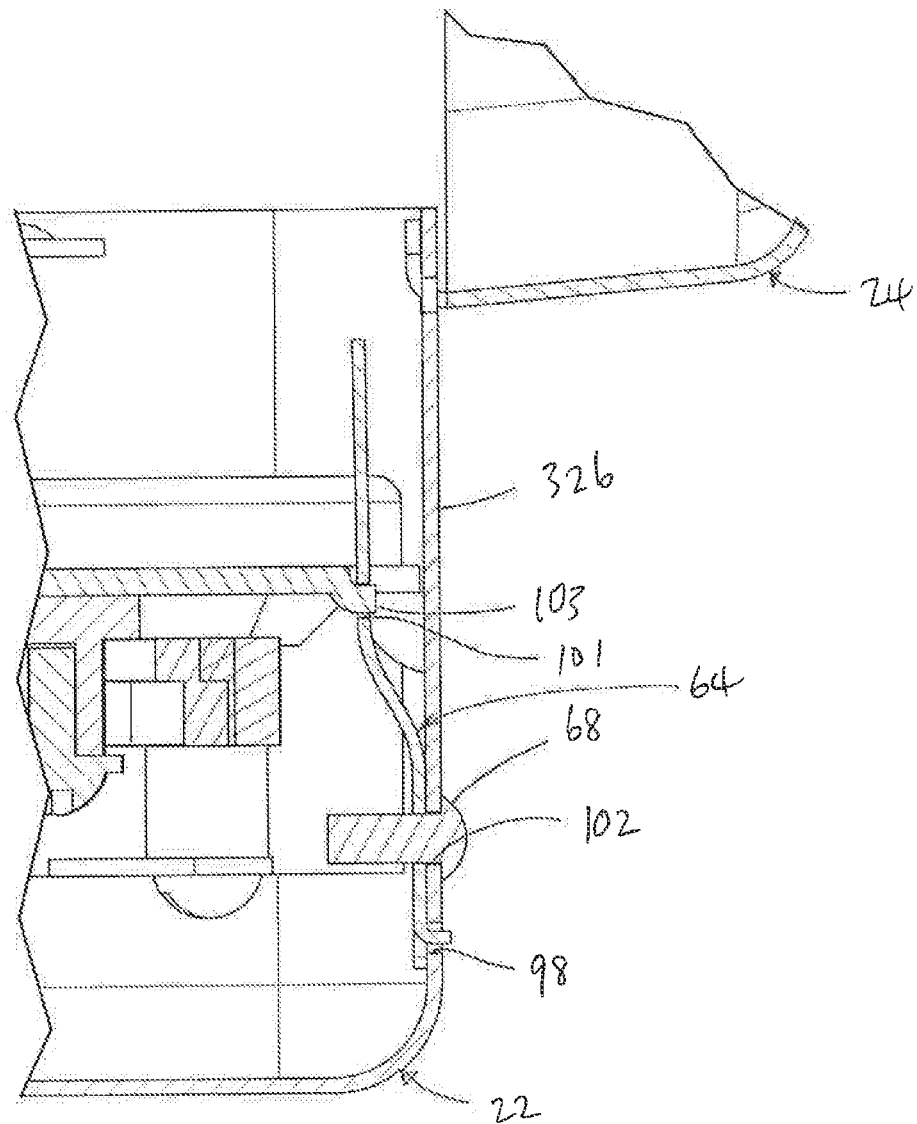
FIG. 15 is a partial section view taken along line 15-15 of FIG. 14.
Figure 16:
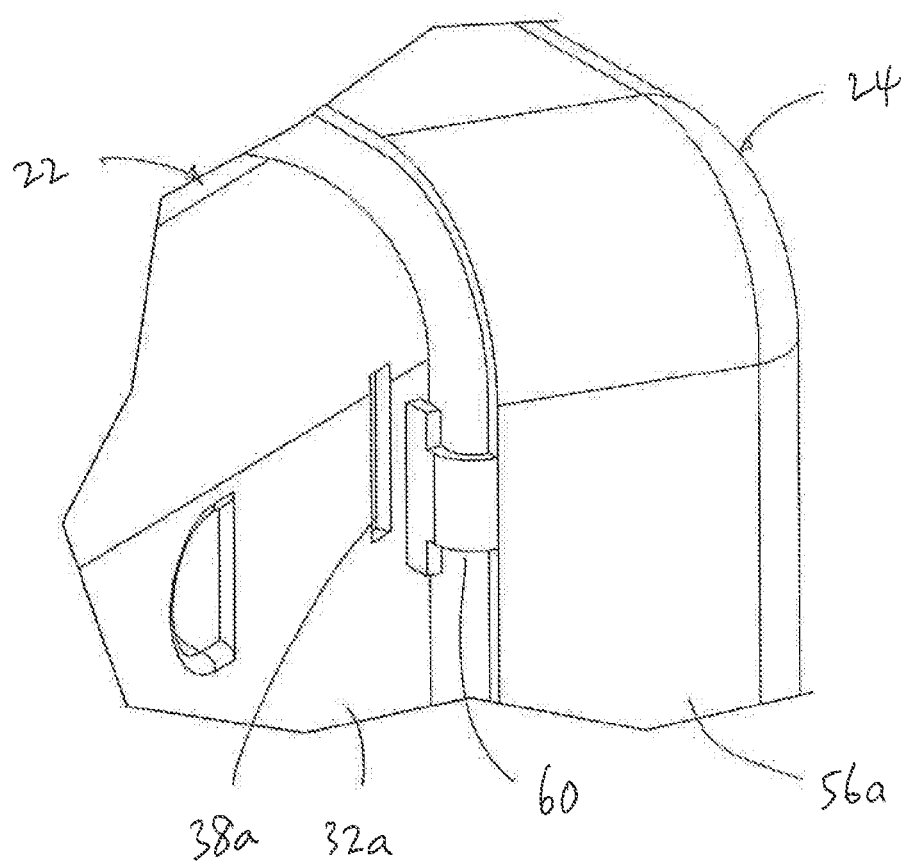
FIG. 16 is a partial isometric view illustrating one of a series of hinge tabs on the cover of the electrical box of FIGS. 1-3 and one of the series of slots on a wall of the base in an initial position prior to engagement of the tab within the slot.

FIG. 13-15 illustrate mechanism latch 64 and the manner in which it is connected to wall 32b of base 22. As shown in FIG. 13, mechanism latch 64 includes a mounting portion 90 and a latch portion 92, and which are interconnected so as to be offset from each other via an intermediate portion 94. The mounting portion 90 includes a tab 96, which is adapted to be positioned within an opening 98 (FIG. 15) formed in base side wall 32b. Mounting portion 90 also includes an opening 100, which is configured to be aligned with an opening 102 (FIG. 15) in base side wall 32b when tab 96 is positioned within opening 98. The rivet 68 extends through the aligned openings 100, 102 in order to secure the mechanism latch 64 to the side wall 32b. When mechanism latch 64 is secured in this manner, the latch portion 92 can be pressed toward the inner surface of side wall 32b to allow timer mechanism T to be moved into position, and returns to its original position so that a slot 101 on latch portion 92 engages mating structure, such as a tab 103, on timer mechanism T to maintain it in position. Timer mechanism T also engages the inward protrusions 46a, 46b of side walls 32a, 32b, respectively, to maintain it in position within the interior of base 22. Latch portion 92 of mechanism latch 64 can similarly be depressed to disengage timer mechanism 66 when it is desired to remove timer mechanism T from the interior of base 22.

Figure 17:
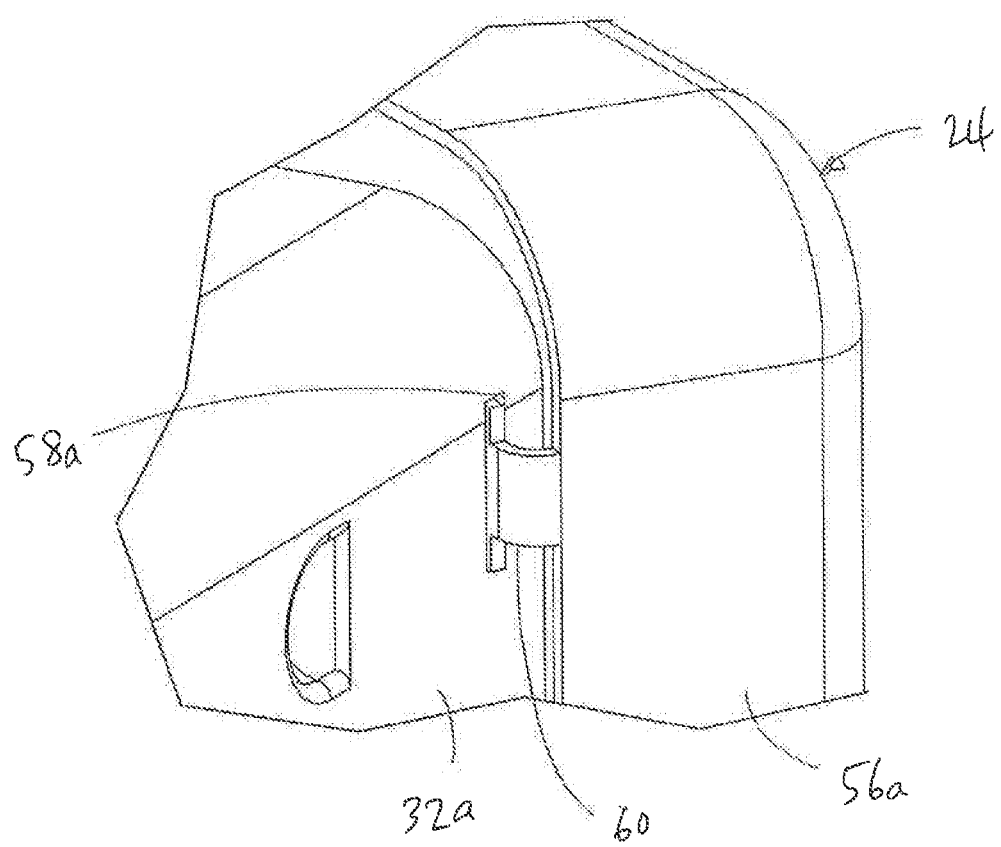
FIG. 17 is a partial isometric view similar to FIG. 16, showing insertion of the hinge tab into the slot.
Figure 18:
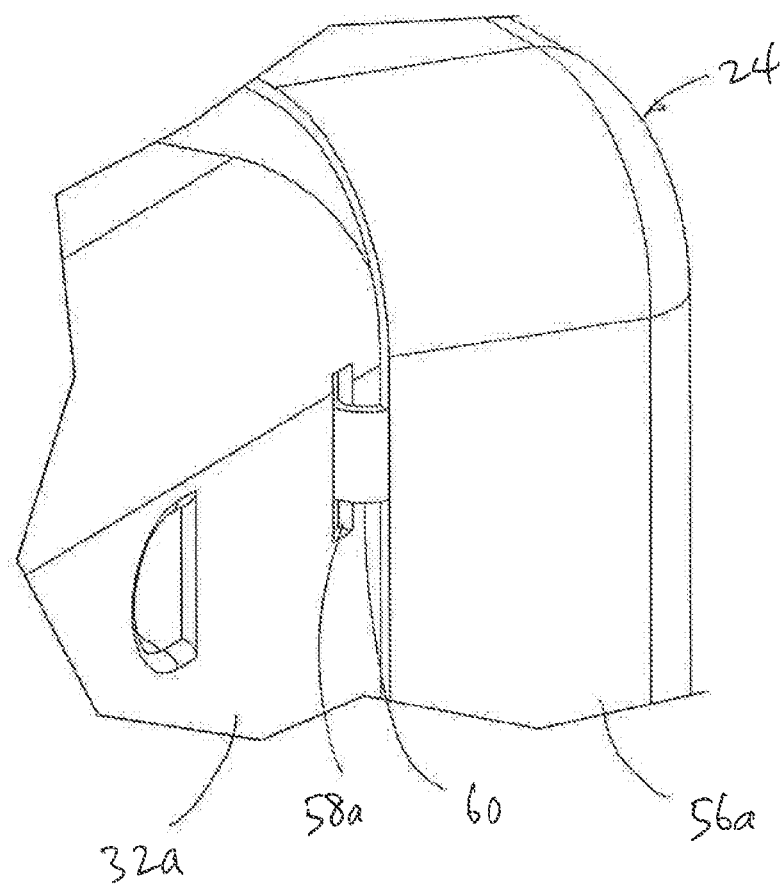
FIG. 18 is a partial isometric view similar to FIGS. 16 and 17, showing movement of the hinge tab through the slot.
Figure 19:
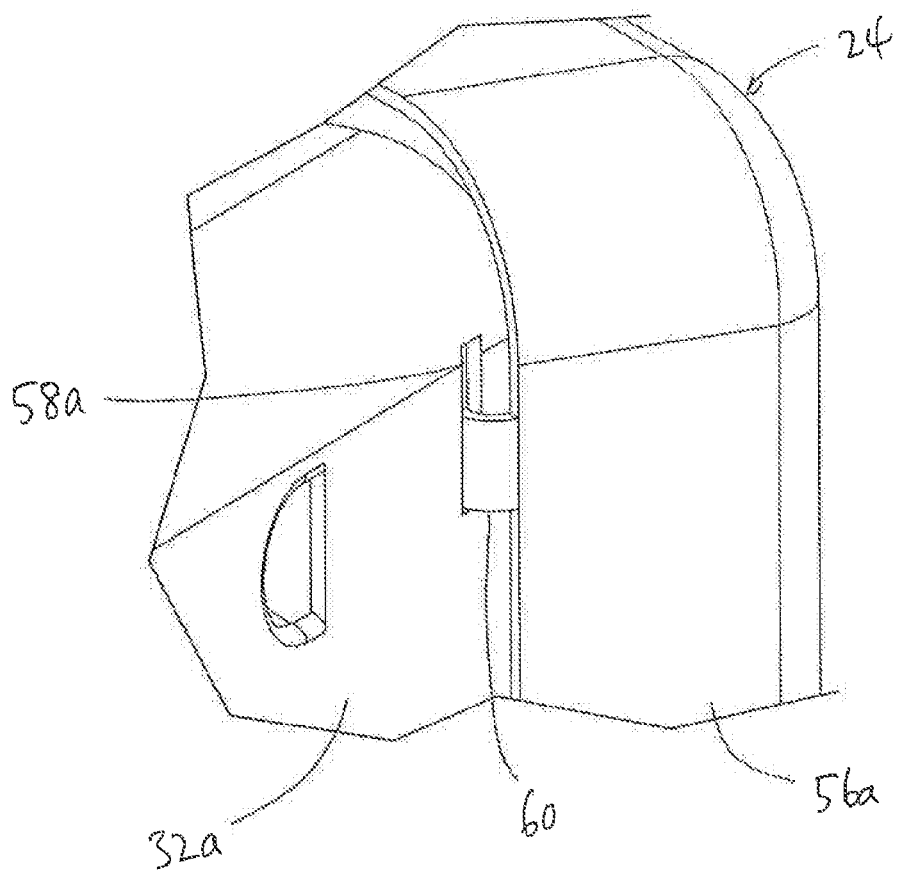
FIG. 19 is a partial isometric view similar to FIGS. 16-18, showing the cover lowered relative to the base after the tab has been moved through the slot to hingedly secure the cover to the base.
Figure 20:
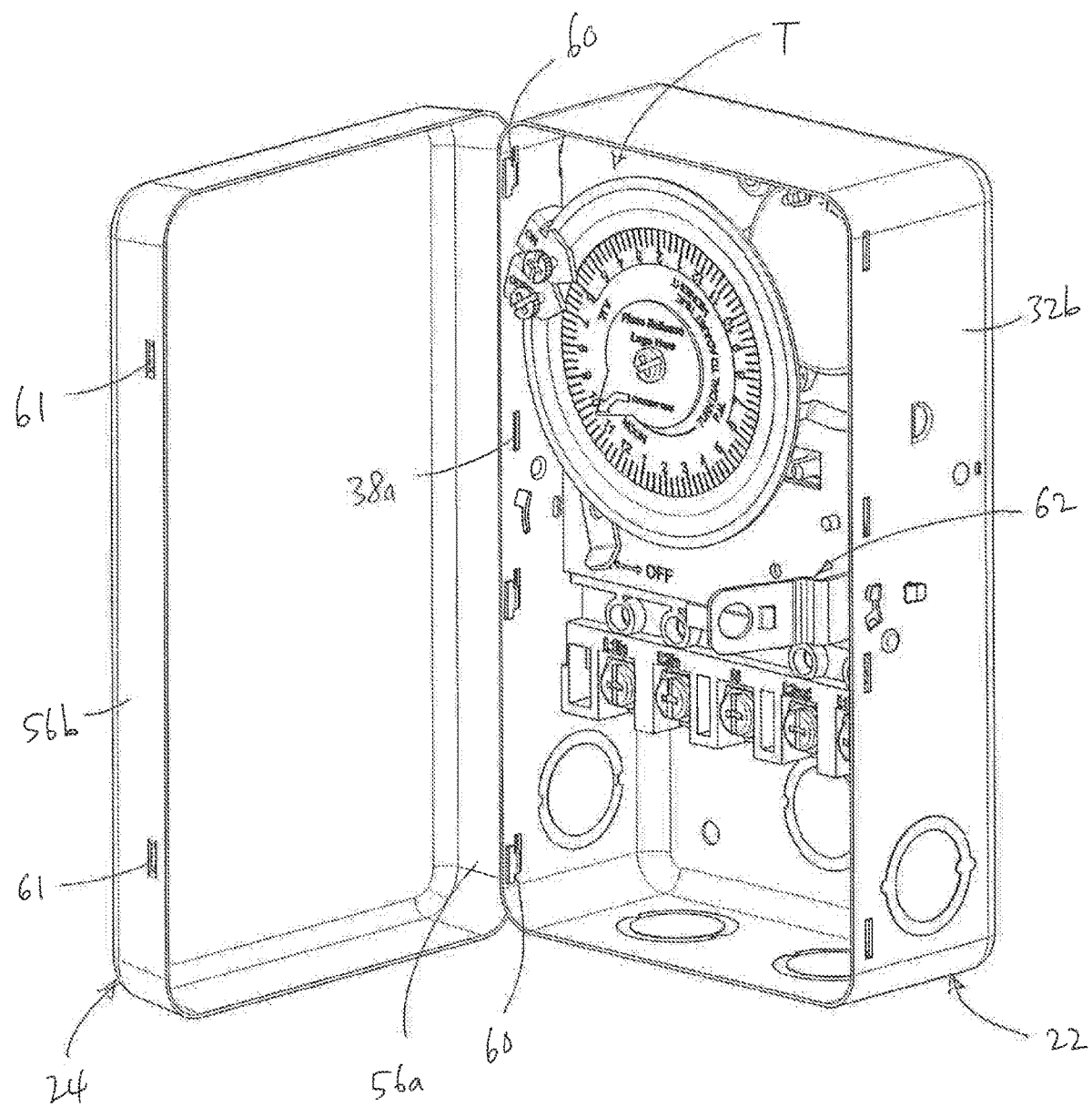
FIG. 20 is an isometric view of the electrical box as in FIGS. 1-3, and in which the reversible latch member is secured to the right side wall of the base and the cover is hinged to the left side wall, wherein the cover is in an open position.
Figure 21:
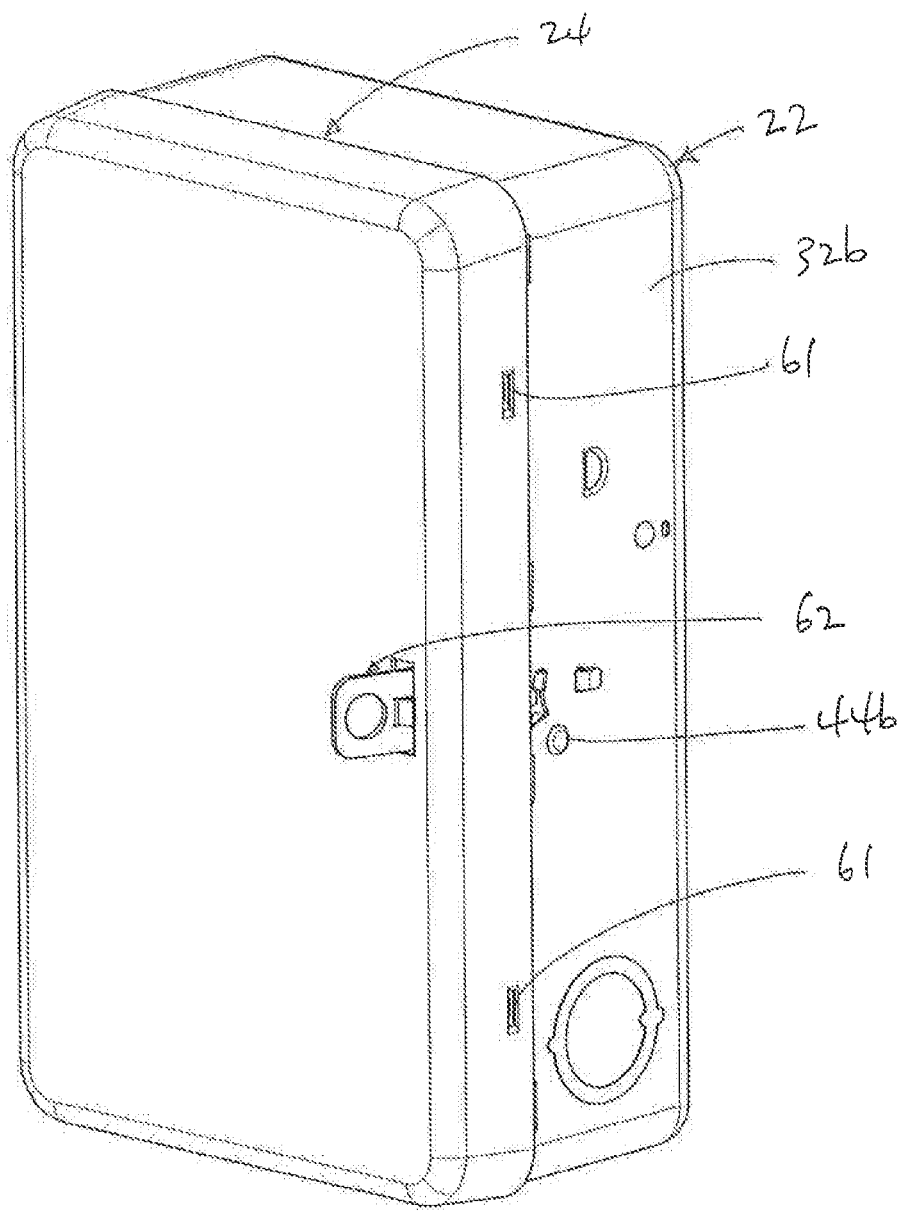
FIG. 21 is an isometric view of the electrical box as in FIG. 20 showing the cover in a closed position.

FIGS. 16-20 illustrate the manner in which cover 24 may be selectively engaged with base 22 in either a left-hand swing or a right-hand swing orientation. To accomplish this, the user first positions cover 24 so that the hinge tabs 60 are aligned with the top, bottom and one of the center ones of the latch openings, such as openings 38a in wall 32a. For example, when securing cover 24 to base 22 so that cover 24 is in a left-hand swing orientation as shown in FIGS. 16-20, the hinge tabs 60 are aligned with the top and bottom slots 38a and one of the center slots 38a of sidewall 32a. The cover 24 is then moved laterally to move the hinge tabs 60 into and through the aligned slots 38a, as shown in FIGS. 17 and 18, so that the vertical portion of each hinge tab 60 passes through the aligned slot 38a. Once the cover 24 is positioned so that the stem portions of the hinge tabs 60 reside within the slots 38a, the user releases the cover 24 so that the binge tabs 60 fall by gravity downwardly within the slots 38a. The lower vertical portion of each hinge tab 60 is then positioned against the area of wall 32a adjacent the lower end of its associated slot 38a. This functions to retain the cover 24 in hinged engagement with the sidewall 32a. If it is desired to secure cover to base 22 so that cover 24 is in a right-hand swing orientation, the above-described process is carried out by engaging the cover binge tabs 60 within the slots 38b of sidewall 32b. As can be appreciated, cover 24 can be removed, repositioned and replaced relative to the base 22 by selectively carrying out or reversing the above-described steps.

With lid latch 62 secured to one of the side walls 32a, 32b as described previously, and with cover 24 hinged secured to the opposite one of side walls 32a, 32b as described above, latch portion 74 of lid latch 62 is received within latch opening 58 of cover 24 when cover 24 is moved toward the closed position. As cover 24 approaches the fully closed position, the edge of latch opening 58 comes into contact with latch tab 86 of lid latch 62, and rides along latch tab 86 during such movement until the edge of latch opening 58 clears the end of latch tab 86. The material and cantilevered configuration of latch portion 74 allows latch portion 74 to bend slightly as the edge of opening 58 passes over latch tab 86, and latch portion 74 springs back to its original position when the edge of opening 58 clears the end of latch tab 86. This functions to position the end of latch tab 78 over the area of cover front wall 50 adjacent opening 58, to secure cover 24 in the closed position. When cover 24 is hinged to wall 32b, as cover 24 is closed the outward protrusion 44a of side wall 32a frictionally engages the inside surface of cover side wall 56a as cover 24, while at the same time the protrusions 61 that extend inwardly from the cover side wall 56 engage the outer surface of base side wall 32a, to frictionally maintain cover 24 in the closed position. If desired, a lock can be positioned within the opening 88 of latch portion 74 to prevent unauthorized movement of cover 24 away from the closed position. When it is desired to open the cover 24, the user manually moves latch portion 74 inwardly an amount sufficient to allow the edge of opening 58 to clear engagement tab 80 as cover 24 is pivoted outwardly toward the open position.

It can thus be appreciated that the present invention provides a versatile construction for an electrical box using a very small number of components. The components used to construct the electrical box can themselves be formed of relatively inexpensive materials using relatively inexpensive tooling and forming processes, which results in a very low cost yet versatile electrical box construction.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It is also understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. An enclosure, comprising:
   a base having a series of walls that cooperate to define an interior;
   a cover, wherein the base and cover include a hinge arrangement that enables the cover to be secured to the base for movement between a closed position in which access to the interior of the base is prevented and an open position that allows access to the interior of the base, wherein the hinge arrangement enables the cover to be hinged to either a first wall of the base or an opposite, second wall of the base; and
   a latch member separate from both the base and the cover, wherein the latch member is configured to be selectively engaged with either the first wall of the base independently of the cover or with the second wall of the base independently of the cover, wherein the latch member is adapted to be selectively engaged with the second wall of the base when the cover is hinged to the first wall of the base and wherein the latch member is adapted to be selectively engaged with the first wall of the base when the cover is hinged to the second wall of the base, wherein the latch member is configured to cooperate with the cover for maintaining the cover in the closed position when the cover is hinged to either the first wall of the base or the second wall of the base.

2. The enclosure of claim 1, wherein the base and the cover comprise an electrical enclosure.

3. The enclosure of claim 1, wherein the hinge arrangement comprises a first set of slots on the first wall of the base and a second set of slots on the second wall of the base, in combination with a set of tabs on the cover, wherein the tabs are engageable with the first set of slots to hinge the cover to the first wall of the base and are engageable with the second set of slots to hinge the cover to the second wall the base.

4. The enclosure of claim 3, wherein each tab has a T-shaped configuration and is positioned within one of the slots such that a stem of the tab is positioned within the slot and an ear of the tab is engaged with the cover adjacent the slot so as to prevent removal of the tab from the slot.

5. The enclosure of claim 3, wherein the latch member is engaged with the first wall of the base via one or more first latch member openings and is engaged with the second wall of the base via one or more second latch member openings.

6. The enclosure of claim 5, wherein the first latch member openings are centered on a height of the first wall and the second latch member openings are centered on a height of the second wall, and wherein the first set of slots on the first wall of the base are offset from a center of the height of the first wall and wherein the second set of slots on the second wall of the base are offset from a center of the height of the second wall.

7. The enclosure of claim 1, wherein the latch member includes a retainer tab and an engagement tab, and wherein the first wall of the base includes a first retainer opening and a first engagement slot spaced therefrom and the second wall of the base includes a second retainer opening and a second engagement slot spaced therefrom, wherein the retainer tab of the latch member is received within the first retainer opening and the engagement tab is movable within the first engagement slot to a first engaged position to secure the retainer member to the first wall, and wherein the retainer tab of the latch member is received within the second retainer opening and the engagement tab is movable within the second engagement slot to a second engaged position to secure the retainer member to the second wall.

8. The enclosure of claim 1, wherein a timer mechanism is adapted to be positioned within the interior of the base, and further comprising a timer mechanism latch that is engageable with the base and the timer mechanism so as to retain the timer mechanism within the interior of the base.

9. The enclosure of claim 8, wherein the timer mechanism is positionable within the interior of the base in either a first orientation or a second orientation, and wherein the timer mechanism latch is engageable with the first wall of the base when the timer mechanism is in the first position and is engageable with the second wall of the base when the timer mechanism is in the second position.

10. An enclosure, comprising:
a base having a series of walls that cooperate to define an interior; and
a cover, wherein the base and cover include a hinge arrangement that enables the cover to be secured to the base for movement between a closed position in which access to the interior of the base is prevented and an open position that allows access to the interior of the base, wherein the hinge arrangement enables the cover to be hinged to either a first wall of the base or an opposite, second wall of the base, wherein the hinge arrangement comprises a first set of slots on the first wall of the base and a second set of slots on the second wall of the base, in combination with a set of tabs on the cover, wherein the tabs are engageable with the first set of slots to hinge the cover to the first wall of the base and are engageable with the second set of slots to hinge the cover to the second wall of the base.

11. The enclosure of claim 10, further comprising a latch arrangement associated with the base for selectively maintaining the cover in the closed position when the cover is hinged to either the first wall of the base or the second wall of the base.

12. The enclosure of claim 11, wherein the latch arrangement comprises a latch member, and wherein the latch member and the first and second walls of the base include engagement structure that enables the latch member to be engaged with the second wall of the base when the cover is hinged to the first wall and that enables the latch member to be secured to the first wall of the base when the cover is hinged to the second wall.

13. The enclosure of claim 10, wherein the cover includes a cover main wall and at least a first side wall, and wherein the set of tabs is provided on the first side wall.

14. A method of assembling an enclosure, comprising the acts of:
providing a base defining an interior and first and second spaced apart walls, wherein the first wall includes a series of first cover engagement openings and a first latch engagement structure, and wherein the second wall includes a series of second cover engagement openings and a second latch engagement structure;
providing a cover having a series of spaced apart hinge tabs; and
providing a latch member separate from both the base and the cover;
hingedly securing the cover to either the first wall by engaging the hinge tabs of the cover with the first cover engagement openings of the first wall of the base, or to the second wall by engaging the hinge tabs of the cover with the second cover engagement openings of the second wall of the base; and
securing the latch member to the second wall of the base independently of the cover when the cover is hingedly secured to the first wall of the base by engaging the latch member with the second latch engagement structure of the second wall of the base, or securing the latch member to the first wall of the base independently of the cover when the cover is hingedly secured to the second wall of the base by engaging the latch member with the first latch engagement structure of the first wall of the base, wherein the latch member is configured to cooperate with the cover for maintaining the cover in the closed position when the cover is hinged to either the first wall of the base or the second wall of the base.

15. The method of claim 14, wherein the hinge tabs have a T-shaped configuration and extend inwardly from a side wall defined by the cover, and wherein the act of engaging the hinge tabs of the cover with the cover engagement openings is carried out by inserting the hinge tabs through the cover engagement openings such that a stem of each hinge tab is positioned within the cover engagement opening and an ear of each tab is positioned in alignment with a wall of the base adjacent the cover engagement opening to retain the hinge tab within the cover engagement opening.

16. The method of claim 15, wherein the cover is positioned relative to the base in an insertion position in which the ear of the tab is capable of passing through the cover engagement opening and, after the tab passes through the cover engagement opening, is allowed to fall by gravity to an engaged position in which the ear of the tab is prevented from passing through the cover engagement opening.

17. The method of claim 14, wherein the first latch member engagement structure on the first wall comprises a first retainer opening and a first engagement slot spaced from the first retainer opening, and the second latch member engagement structure on the second wall comprises a second retainer opening and a second engagement slot spaced from the second retainer opening.

18. The method of claim 17, wherein the latch member includes a retainer tab and an engagement tab, and wherein the act of securing the latch member to the first wall is carried out by engaging the retainer tab within the first retainer opening and moving the engagement tab within the first engagement slot from an insertion position to an engaged position to secure the latch member to the first wall, and wherein the act of securing the latch member to the second wall is carried out by engaging the retainer tab within the second retainer opening and moving the engagement tab within the second engagement slot from an insertion position to an engaged position to secure the latch member to the second wall.

* * * * *